Figure 1:
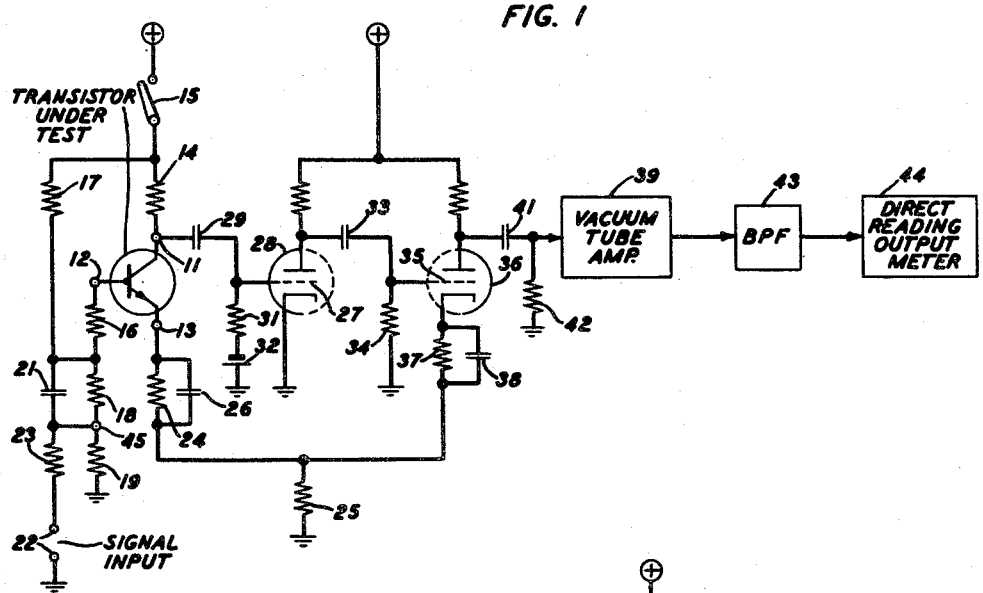

May 3, 1960 H. E. LANNING 2,935,684
DIRECT READING NOISE FIGURE MEASURING INSTRUMENT
Filed Nov. 26, 1956

INVENTOR
H. E. LANNING
BY
Walter M. Hill
ATTORNEY

United States Patent Office 2,935,684
Patented May 3, 1960

2,935,684

DIRECT READING NOISE FIGURE MEASURING INSTRUMENT

Harold E. Lanning, Newark, N.J., assignor to Bell Telephone Laboratories, Incorporated, New York, N.Y., a corporation of New York Application November 26, 1956, Serial No. 624,323

5 Claims. (Cl. 324—158)

This invention relates to electrical measuring apparatus and more particularly to apparatus for measuring directly the noise figure of signal translating devices, such as transistors and vacuum tubes.

One of the tests necessary to properly classify transistors and vacuum tubes, to insure their satisfactory performance in the equipment for which they are intended, is the measurement of noise figure. The term "noise figure" used herein designates the measure of the noise generated internally of a transistor or vacuum tube.

A procedure heretofore followed for the measurement of noise figure requires the use of a calibrated noise generator. With the noise generator connected to the input of the device, whose noise figure is to be measured, the output noise power is first measured with the generator turned off. The generator is then turned on and adjusted to double the output power. Since the output power is doubled, the power added must be equal to that previously present, and by using a calibrated generator, the noise figure can be read directly from the generator dial setting. An alternative procedure, substantially the same as this, makes use of a calibrated sine-wave signal generator rather than the calibrated noise source.

Other noise figure measuring devices have been suggested which differ slightly from that set forth above. For example, in an article by R. F. Merrithew, entitled "Noise Analyzer for Transistor Production," Electronics, vol. 26, May 1953, pages 136 and 137, a direct reading instrument, using calibrated attenuators, is suggested. Here, the attenuators are adjusted, rather than the input generator and the noise figure is read directly from the noise attenuator dial.

The above outlined systems and procedures are, however, not entirely satisfactory for many purposes, due to the cost of calibrated input noise or sine-wave signal generators and the time consumed in the adjustments described above. The time consumed in adjusting the input generator or attenuators, as the case may be, can prove to be very costly when a great number of transistors or vacuum tubes are to be measured.

It is an object of this invention, therefore, to rapidly and directly measure the noise figure of signal translating devices without the use of calibrated input noise or signal generators or intermediate adjustments.

Another object of this invention is to provide a device for measuring noise figure which is simple in construction yet rapid and expeditious in operation.

These objects are attained in accordance with the present invention by the use of negative feedback around the input transistor, and/or vacuum tube, circuit to maintain the gain thereof constant. Thus even though numerous transistors having varying degrees of voltage gain are inserted in the input circuit for testing, the circuit gain, and hence over-all system gain, will remain constant. By insuring a constant system gain, and determining the input thermal noise, an output meter can be calibrated to read noise figure directly.

In one specific embodiment of the invention, the noise figure measuring device comprises an input amplifier circuit adapted to receive the transistor, and/or vacuum tube, to be tested. This input circuit possesses an input resistance of known thermal noise characteristics, as well as means for negatively feeding back a predetermined portion of the output. A low noise amplification means and band pass filter couple the output of the amplifier circuit to an output meter which is calibrated to provide a direct reading measurement of the noise figure of the device under test.

Figure 2:
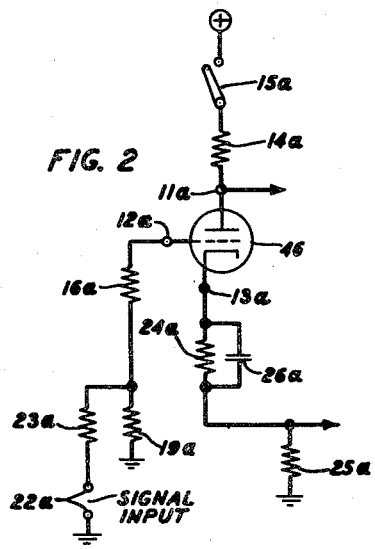

Other objects and many of the attendant advantages of the invention will be readily appreciated as the same becomes better understood by reference to the following detailed description when considered in connection with the accompanying drawings in which:

Fig. 1 is a schematic diagram illustrating an embodiment of the invention for measuring the noise figure of a transistor; and Fig. 2 shows the device of Fig. 1 modified to measure the noise figure of a vacuum tube.

The efficacy of the circuit of the present invention as a noise figure measuring device may be better understood from the following mathematical considerations. With a transistor connected in the circuit of Fig. 1, its noise figure expressed in decibels can be determined in accordance with the following formula:

$$\text{N.F.}_{(db)} = No - M - G \qquad (1)$$

where $No$ = total output noise (measured by the output meter);
$M$ = thermal noise of the input resistance
   = $10 \log[4kTR(f_2-f_1)]$;
$(f_2-f_1)$ = equivalent bandwidth in cycles per second (as determined by the band pass filter);
$k$ = Boltzmann's constant
   = $1.374 \times 10^{-23}$ joule per ° K.;
$T$ = absolute temperature, ° K.;
$R$ = resistance in ohms; and
$G$ = voltage gain of the system.

From this formula it will be seen that if the total voltage gain of the system were constant and M initially calculated, an output meter could be provided to read directly the noise figure of the transistors under test. But, since the voltage gain is not the same for all transistors, the total voltage gain must necessarily be remeasured every time a transistor is changed.

The change in gain of an amplifier stage, with feedback, with respect to a change in gain without feedback is:

$$\frac{dA}{dA_0} = \frac{1}{(1-A_0\beta)} \times \frac{A}{A_0} \qquad (2)$$

where $A$ = gain with feedback;
$A_0$ = gain without feedback; and
$A_0\beta$ = feedback factor (amount of feedback).

Transposing Equation 2 gives:

$$\frac{dA}{A} = \frac{1}{(1-A_0\beta)} \times \frac{dA_0}{A_0} \qquad (3)$$

Expressing Equation 3 logarithmically, for small changes in $A_0$:

$$d \log A = \frac{1}{(1-A_0\beta)} d \log A_0 \qquad (4)$$

Considering Equation 4, it will be seen that with a feedback factor $(A_0\beta)$ of forty decibels $$d \log A \simeq \frac{1}{100} d \log A_0$$

and any change in log $A_0$ is reduced by a factor of approximately 100. Hence, if the transistor stage gain without feedback varied by say two decibels, the gain with feedback would only vary by approximately two hundredths of a decibel. For this reason the transistor stage gain, and over-all system gain, can be maintained practically constant even though transistors having varying degrees of gain are inserted in the circuit.

With specific reference to the form of the invention illustrated in Fig. 1, a transistor of the n-p-n type is shown connected to the test terminals 11, 12 and 13. The collector of the transistor is connected, through resistance 14 and switch 15, to a source of positive voltage, with the base of the transistor likewise coupled to this source through resistance 16, base biasing resistance 17 and switch 15. Switch 15 is provided to reduce transient voltages in the system and should be opened prior to the removal of a transistor and the insertion of a successive one into the circuit.

Bias resistance 18 and resistance 19 are connected in series between ground and the junction of resistance 16 and 17, and by-pass capacitance 21 is shunted across resistance 18. The junction of resistances 18 and 19 is connected to the signal input terminals 22 through isolating resistance 23. The emitter of the transistor is coupled to ground through bias resistance 24 and resistance 25, the resistance 24 being shunted by capacitance 26.

For test purposes, it is desirable to maintain a fairly stable collector current; that is, the collector currents for the various transistors under test should be approximately the same. It has been found that this necessary stability can be achieved by the proper selection of values for the bias resistances 17, 18 and 24, and specifically it has been determined that maximum stability is achieved when the resistances 18 and 24 are substantially of the same value.

One set of transistor operating conditions found to be satisfactory is as follows:

| | |
|---|---|
| Bias resistances 18 and 24 | 5,000 ohms; |
| Bias resistance 17 | 42,700 ohms; |
| Resistance 14 | 31,600 ohms; |
| Input resistance (R) | 1,000 ohms; |
| Collector voltage | 3.0 v.; |
| Collector current | 200 μa.; and |
| Positive voltage source (+) | 10.5 v. |

Now assuming the noise figure measurements are to be made at say 1,000 cycles per second, the capacitance 21 is chosen of sufficient size to provide a by-pass around resistance 18 for this frequency. The effective input resistance (R), therefore, consists of series resistances 16 and 19, and their combined resistance is, as indicated above, equal to 1,000 ohms.

The output of the transistor circuit is coupled to the grid 27 of triode 28 by means of capacitance 29 and resistance 31, the grid 27 being biased slightly negative by a source of voltage 32. The output from triode 28 is in turn coupled to the grid 35 of triode 36 by means of capacitance 33 and resistance 34. In addition to the resistance 37 and by-pass capacitance 38, the cathode circuit of triode 36 includes the resistance 25 for achieving the desired negative feedback. The feedback voltage is developed across this unbypassed cathode resistor as a result of the flow of plate current through it and since the resistor is also in the emitter circuit of the transistor, this voltage is fed back to the transistor.

From Equation 4 and the related discussion, it will be seen that the greater the feedback the higher the accuracy of the device. A feedback factor that approaches forty or more decibels has been found to provide highly satisfactory results. The use of several amplifier stages in the input amplifier circuit assists in achieving the large amount of feedback desired. The input amplifier circuit can in fact comprise any number of amplification stages provided proper attention is given to phase relations.

A stable low noise vacuum tube amplifier 39 of conventional design is coupled to the output of triode 36 by means of capacitance 41 and resistance 42. The output of this low noise amplifier is in turn connected to band pass filter 43 which is connected to output meter 44. Filter 43 can be of conventional inductance-capacitance design with a center frequency corresponding to the frequency under test and a pass band of one octave. For the output meter 44 any standard meter possessing a decibel scale may be used.

The circuit of the present invention may be used in several ways, the exact manner of calibration being determined by the use to which it is put. To assign a numerical value to each transistor indicative of its noise figure, a signal generator, tuned to the frequency under test (1,000 cycles/second), is connected to the signal input terminals 22. With the filter centered about 1,000 cycles per second, the equivalent bandwidth $(f_2-f_1)$ is determined by graphic integration and the thermal noise of the input resistance (M) is calculated. Next the system gain is determined by measuring the input at the terminals 22 and the output from the band pass filter 43. Consideration of course must be given to the loss in the resistances 19 and 23, but knowing their values one can readily calculate the same. This loss is added to the measured gain to give the true value of total system gain (G). After the determination of system gain, the input generator can be disconnected as it is no longer needed.

Even during these initial measurements the transistor will of course provide some degree of output noise power but if the signal input is of sufficient intensity to override this power the latter may be considered negligible and can be disregarded. With the signal generator disconnected, the output meter will now provide a decibel indication of the total output noise (No), and since the values of No, G and M are known the noise figure (N.F.) of the transistor can be determined from Equation 1.

By conventional means the gain of the vacuum tube amplifier can be reduced, or attenuated, until the output meter reading is equivalent to the calculated noise figure (N.F.). Thereafter as successive transistors are inserted into the circuit the output meter will provide a measure of their respective noise figures. While the other elements such as the vacuum tube amplifier 39 and band pass filter 43 do provide some degree of noise, the noise contributed thereby is negligible in comparison with that produced by the input resistance thermal noise and the transistor stage noise.

An alternative and more simplified method of using and calibrating the circuit of the present invention makes use of a transistor having known, desirable, noise characteristics. This transistor is initially connected to the terminals 11, 12 and 13 and the output meter indication is recorded. Thereafter, successive transistors, of unknown noise figure, are connected into the circuit and the respective output meter readings noted. All transistors providing a higher output noise figure indication than the standard are rejected. For ease in reading, the meter can be provided with a "good-bad" scale, the line of demarcation being determined initially by the reading for the standard transistor.

The circuit of Fig. 1 must be modified slightly to utilize the invention for the measurement of vacuum tube noise figure. In the Fig. 2 circuit those elements which find their counterparts in Fig. 1 are designated by the same reference numerals followed by the suffix (a). The vacuum tube 46 is inserted into the circuit with the plate connected to terminal 11a, the grid to terminal 12a and the cathode to terminal 13a. The bias resistances 17 and 18 and by-pass capacitance 21, of Fig. 1, are eliminated in the Fig. 2 circuit. The necessary stability in this case is achieved by the use of a large cathode resistance 24a, which maintains a fairly constant output plate current. As in the Fig. 1 modification, the resistances 16a and 19a taken together are equal to 1,000 ohms. The remaining portions of the Fig. 2 modification are essentially the same as that illustrated in Fig. 1, and the manner of using and calibrating the Fig. 2 modification follows that of Fig. 1. The vacuum tube operating conditions, of course, necessarily differ from that of the transistor.

The listed transistor operating conditions, as well as the specific type of feedback shown, are only by way of example and it should be clear at this point that other operating conditions, and any of the other known ways for providing negative feedback, may readily be used in the present invention. Further, should it be desirable to determine noise figure at other selected frequencies, it may be necessary to alter the values of some of the circuit components. For example, the capacitance 21 should be of a size to provide a by-pass around resistance 18 at the frequency under test. These modifications are of course within the skill of those in the art.

It must be understood, therefore, that the foregoing disclosure relates to only preferred embodiments of the invention and that numerous modifications or alterations may be made therein without departing from the spirit and scope of the invention.

What is claimed is:

1. A noise figure measuring instrument comprising an input amplifier circuit adapted to receive a signal translating device whose noise figure is to be measured, said amplifier circuit having an input resistance of predetermined thermal noise characteristics, amplification means of predetermined band pass coupled to the output of said amplifier circuit, feedback means for negatively feeding back a portion of the output of said amplifier circuit to the input thereof, and a calibrated meter responsive to the output of said amplification means to provide a direct reading measurement of the noise figure of said signal translating device.

2. A noise figure measuring instrument comprising an input amplifier circuit adapted to receive a signal translating device whose noise figure is to be measured, said amplifier circuit having an input resistance of predetermined thermal noise characteristics, low noise vacuum tube amplifier means coupled to the output of said amplifier circuit, feedback means for negatively feeding back a portion of the output of said amplifier circuit to the input thereof, a filter of predetermined center frequency and band pass characteristics coupled to the output of said low noise amplifier means, and a calibrated meter responsive to the output of said band pass filter to provide a direct reading measurement of the noise figure of said signal translating device.

3. A noise figure measuring instrument comprising an amplifier circuit of multiple stages, the input stage of said amplifier circuit being adapted to receive a signal translating device whose noise figure is to be measured, said input stage having an input resistance of predetermined thermal noise characteristics, amplification means of predetermined band pass coupled to the output stage of said amplifier circuit, feedback means for providing a large amount of negative feedback from said output stage to said input stage, and a calibrated meter responsive to the output of said amplification means to provide a direct reading measurment of the noise figure of said signal translating device.

4. A noise figure measuring instrument comprising an amplifier circuit of multiple stages, the input stage of said amplifier circuit being adapted to receive a signal translating device whose noise figure is to be measured, said input stage having an input resistance of predetermined thermal noise characteristics, means included within said input stage for maintaining the output load current of said signal translating device stable, amplification means of predetermined band pass coupled to the output stage of said amplifier circuit, feedback means for providing a large amount of negative feedback from said output stage to said input stage, and a calibrated meter responsive to the output of said amplification means to provide a direct reading measurement of the noise figure of said signal translating device.

5. A transistor noise figure measuring instrument comprising an amplifier circuit of multiple stages, the input stage of said amplifier being adapted to successively receive transistors whose noise figures are to be measured, said input stage having an input resistance of predetermined thermal noise characteristics, bias means included within said input stage for maintaining a stable transistor collector current, amplification means of predetermined band pass coupled to the output stage of said amplifier circuit, feedback means for providing a large amount of negative feedback from said output stage to said input stage, and a calibrated meter responsive to the output of said amplification means to provide a direct reading measurement of the noise figure of the transistor under test.

References Cited in the file of this patent

UNITED STATES PATENTS

| | | |
|---|---|---|
| 2,587,697 | Conrad | Mar. 4, 1952 |
| 2,620,438 | Cotsworth | Dec. 2, 1952 |
| 2,691,098 | Selove | Oct. 5, 1954 |